United States Patent [19]
Bowen

[11] Patent Number: 4,902,093
[45] Date of Patent: Feb. 20, 1990

[54] LASER DIODE TO FIBER REFLECTIVE COUPLING

[75] Inventor: Terry P. Bowen, Etters, Pa.

[73] Assignee: AMP Incorporated, Harrisburg, Pa.

[21] Appl. No.: 223,033

[22] Filed: Jul. 22, 1988

[51] Int. Cl.$^4$ ................................................ G02B 6/36
[52] U.S. Cl. ................................. 350/96.20; 350/96.18
[58] Field of Search ................. 350/96.15, 96.18, 96.20

[56] References Cited

U.S. PATENT DOCUMENTS

| | | | |
|---|---|---|---|
| 4,261,638 | 4/1981 | Wagner | 350/96.20 |
| 4,358,858 | 11/1982 | Tamura et al. | 350/96.18 X |
| 4,763,978 | 8/1988 | Courtney et al. | 350/96.18 |

OTHER PUBLICATIONS

"Solid State Pumping Source For Nd:YAG Lasers integrated focusing optics" by Farmer et al, IBM Technical Bulletin vol. 15, No. 1, Jun. 1972, pp. 149-150.

"A simple device for the efficient coupling of a light emitting diode to an optical fibre" by Beach, J. of Physics E. S. Instruments, Sep. 1975, vol. 8, pp. 745-747.

Primary Examiner—William L. Sikes
Assistant Examiner—Akm E. Ullah

[57] ABSTRACT

A mechanism for coupling radiation from a laser diode (3) into an optical fiber (5) utilizing a spherical mirror (20) is disclosed. To compensate for the disparity in numerical apertures between the laser (3) and fiber (5), the laser emission facet (10) is located closer to the spherical mirror (20) than the one to one imaging plane and the fiber entrance face (6) is located further from the mirror (20) than the one to one imaging plane.

15 Claims, 1 Drawing Sheet

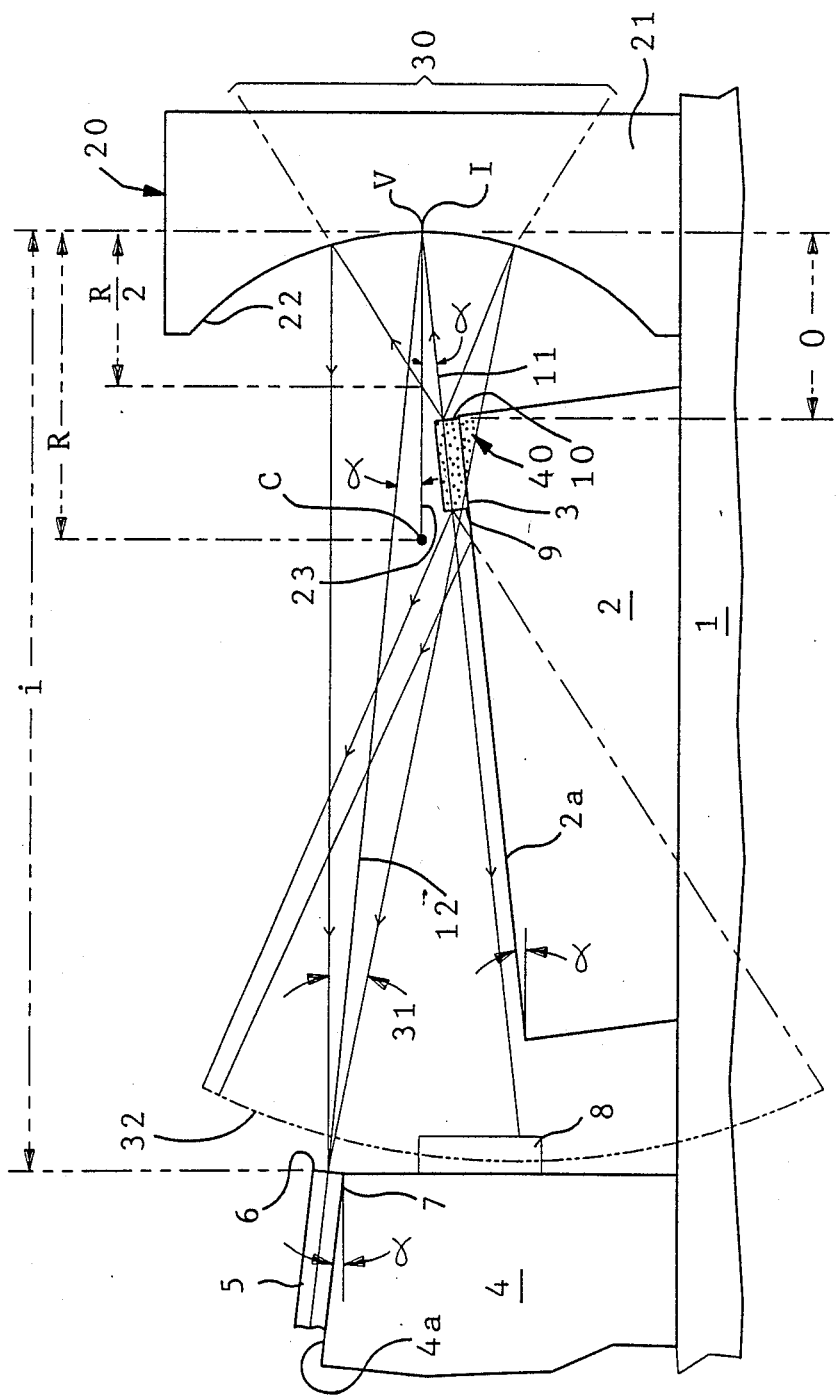

LASER DIODE TO FIBER REFLECTIVE COUPLING

FIELD OF THE INVENTION

The present invention relates to a laser diode to optical fiber coupling and, more particularly, to a laser diode to optical fiber coupling using a spherical mirror.

BACKGROUND OF THE INVENTION

In an optical communications system, optical signals may be generated by semiconductor laser diodes and are transmitted over optical fibers from one location to another. Such optical systems operate most efficiently when the laser diodes and fibers are coupled with minimal power loss.

The basic structure of the optical fiber comprises a core of high purity glass that is surrounded by a cladding glass with a somewhat lower index of refraction. Light launched into the core of the fiber from a laser diode is guided within the core as a result of the index of refraction difference at the core cladding interface.

The laser diode is typically a semiconductor diode laser which includes waveguide structures for laterally and transversely guiding light emitted as a result of applying a pumping current to a thin active layer. Thus, the problem of coupling a laser diode to an optical fiber may be viewed as the problem of coupling two waveguides (i.e., a laser waveguide and an optical fiber waveguide), which waveguides have different optical properties. The dimensions of the laser waveguide are relatively small (e.g., 1 micron), while the fiber core has larger dimensions (e.g., 10 microns). Similarly, the laser has a relatively large numerical aperture (e.g., 0.5) and the fiber has a relatively small numerical aperture (e.g., 0.1). The numerical aperture ("NA") for an optical fiber is approximately equal to the sine of the radiation or acceptance angle of the fiber multiplied by the index of refraction of the material in contact with the entrance or exit face of the fiber. Similarly, for a laser, the numerical aperture is approximately equal to the sine of the radiation angle of the laser multiplied by the index of refraction of the material in contact with the laser emission facet.

The simplest way to couple a laser diode and an optical fiber is to align the fiber in front of the laser diode at close range. However, because of the differences in dimensions and numerical aperture between the laser diode and fiber, such butt coupling is highly inefficient.

The problem of coupling a laser diode and an optical fiber may be solved with improved efficiency by interposing a lens between the fiber and the laser diode. However, in practice, the use of such a lens is difficult. More particularly, alignment of the fiber lens laser combination often requires mechanical adjustments of the fiber to within a fraction of a micron. Such alignment is difficult to achieve and maintain because of the small mass and elongated structure of the fiber.

Another type of coupling mechanism involves use of a spherical reflector. For example, U.S. Pat. Application Ser. No. 053,220, entitled "Fiber Optic Bypass Switch" and filed on May 13, 1987, discloses a system wherein a spherical mirror is used to couple radiation from a first optical fiber to a second optical fiber by reflection. The coupling system of the above identified patent application makes use of a particular imaging property of a spherical mirror. A point source of light, located in the plane at twice the focal length from the spherical mirror and slightly displaced from the center of curvature, is imaged with minimal aberration at a point located in the same plane and symmetrically located with respect to the center of curvature. The imaging plane, in this case, is called the one to one imaging plane. Using this imaging property, light can be imaged from one optical fiber to another when both fibers have end faces located in the one to one imaging plane of the mirror and when both end faces are symmetrically located with respect to the center of curvature of the mirror. Such one to one imaging is optimum for like objects such as two optical fibers. However, the above identified patent application does not disclose a mechanism to optically compensate when coupling two waveguides having disparate optical properties such as an optical fiber waveguide and a laser diode waveguide. A suitable mounting for a directly coupled laser diode and an optical fiber must maintain a separation between the emission facet of the diode and the fiber, thereby to prevent alteration of the desired resonance of the diode. The separation is reduced to a minimum distance, measured in microns, to achieve optimum one to one coupling. Difficulty in maintaining separation is experienced because the mounting will experience thermal expansion when subjected to variable ambient temperature and thermal energy emanating from operation of the diode.

Use of an spherical mirror to couple the diode to a laser is an alternative to direct coupling. However, to couple the diode and the fiber at the imaging plane of a spherical mirror will achieve no increase in coupling efficiency as compared to a directly coupled diode and optical fiber.

In view of the foregoing, it is an object of the present invention to utilize a spherical mirror to couple two unlike waveguides such as an optical fiber and a laser diode in such a way as to compensate for their disparate optical properties.

SUMMARY OF THE INVENTION

In accordance with the present invention, radiation is coupled from a first waveguide such as a laser diode into a second waveguide such as an optical fiber through the use of a spherical mirror. Because the optical fiber and the laser diode have different optical properties (i.e., different dimensions and different numerical apertures), one to one imaging is not utilized. Instead, the front emission facet of the laser diode is placed closer to the spherical mirror than the one to one imaging plane, and the entrance face of the fiber is placed further away from the mirror than the one to one imaging plane. This compensates for the disparity between the numerical aperture of the laser and the numerical aperture of the fiber.

To couple light from a laser diode into an optical fiber in accordance with the present invention, the laser diode and optical fiber are mounted on the same mounting structure to fix the relative spacing between the emission facet of the laser diode and the entrance face of the optical fiber and to fix the angular relationship between the longitudinal axis of the laser diode and the longitudinal axis of the optical fiber. The position of the mirror is then adjusted until maximum coupling is achieved. The mirror is then fixed into its position using for example a welding technique or an ultraviolet sensitive cement.

The mirror may be viewed as having an optical axis wherein a ray of light propagating along the axis is reflected back on itself. The axis passes through the center of curvature of the mirror and the vertex of the mirror. To achieve maximal coupling of light energy between the laser diode and the optical fiber, the emission facet of the laser diode is located on one side of the axis and closer to the mirror than the one to one imaging plane. Similarly, the entrance face of the fiber is located on the opposite side of the axis and further away from the mirror than the one to one imaging plane. This has the effect of magnifying the size of the laser source spot size to compensate for the disparity in numerical apertures between the laser and fiber. In addition, the laser diode and optical fiber should be tilted so that the longitudinal axis of the laser diode and the longitudinal axis of the optical fiber intersect the optical axis of the mirror at the vertex of the mirror.

The laser diode to optical fiber coupling mechanism of the present invention provides significant advantages over prior art coupling mechanisms. The coupling mechanism of the present invention is of simple design and low cost so that its manufacture is highly attractive. In addition, the coupling mechanism of the present invention offers a more stable and improved coupling efficiency in comparison to prior art coupling mechanisms. The need for fraction of a micron position adjustments of the low mass fiber to achieve maximal energy coupling is eliminated in the present invention. Instead, in the present invention, the position of the mirror is adjusted to achieve maximal coupling. It is easier to make small adjustments in the position of the mirror which is relatively massive than in the position of the fiber which has little mass. A detector for detecting rear facet emissions of the laser diode may easily be incorporated as part of the coupling 25 mechanism.

BRIEF DESCRIPTION OF THE DRAWING

The FIGURE schematically illustrates by way of example, a coupling mechanism for a waveguide in the form of a laser diode and a waveguide in the form of an optical fiber.

DETAILED DESCRIPTION OF THE INVENTION

Turning to the FIGURE, a mechanism for coupling radiation from a laser diode into an optical fiber is illustrated. The coupling mechanism includes a common submount 1. A laser submount 2 is fixedly mounted on the common submount 1. The laser diode 3 is in turn mounted on a sloping surface 2a of the laser submount 2.

A fiber submount 4 is also fixedly mounted on the common submount 1. Mounted on a sloping surface 4a of the fiber submount 4 is the optical fiber 5. In the FIGURE, the fiber 5 is shown as having a flat entrance end face 6, although in alternative embodiments of the invention, the fiber tip 7 may be tapered and/or lensed.

The laser submount 2 and the fiber submount 4 are fixedly attached to the common submount 1 to produce a single mounting structure which rigidly fixes the position of the front laser emission facet 10 with respect to the fiber entrance face 6. As is discussed in more detail below, the single mounting structure also serves to fix the annular relationship between the longitudinal axis 11 of the laser diode and the longitudinal axis 12 of the fiber.

Radiation leaving the front emission facet 10 of the laser diode 3 is coupled into the entrance face 6 of the fiber 5 by means of the spherical mirror 20. The mirror 20 comprises a body 21 formed from a material which is thermally stable such as glass. A spherical reflecting surface 22 is formed on the body 21. The center of curvature of the spherical surface 22 is designated C in the FIGURE and the radius of the spherical surface is designated R. Typically, R is about 0.05 inches. An optical axis 23 passes through the center of curvature C and intersects the mirror at the vertex V.

The plane which includes the center of curvature C and is normal to the optical axis 23 is the one to one imaging plane. A source of light located in the one to one imaging plane and slightly displaced from the optical axis is imaged in a one to one fashion to a location in the one to one imaging plane that is symmetrical with respect to the optical axis.

In accordance with the present invention, one to one imaging is generally not used to couple radiation from the laser diode 3 into the optical fiber 5. The reason for this is that the laser and optical fiber have different optical properties. Illustratively, as indicated above, the laser diode comprises an active waveguide having dimensions on the order of 1 micron and a numerical aperture on the order of 0.5. In contrast, the core of the fiber 7 has a diameter on the order of 10 microns and a numerical aperture of about 0.1. Thus, as can be seen in FIG. 1, the 0.5 numerical aperture of the laser diode 3 corresponds to a relatively wide cone of light 30 leaving the laser and the 0.1 numerical aperture of the fiber corresponds to a relatively narrow cone of light 31 entering the optical fiber.

Because of the disparity in dimensions and numerical apertures between the laser emission facet and the fiber entrance face, the laser spot size is magnified so that radiation emitted therefrom couples efficiently into the fiber.

Thus, the front emission facet of the laser is positioned at an axial distance "o" from the vertex V of the mirror and the entrance face of the fiber is positioned an axial distance "i" from the vertex V of the mirror. If the laser and the fiber are positioned sufficiently close to the optical axis so that the light rays leaving the laser and the light rays entering the fiber make sufficiently small angles with the optical axis of the mirror, the distances i and o are approximately related by the formula:

$$1/i + 1/o = 1/f = 2/R$$

where f is the focal length of the mirror (f=R/2), and the magnification is given by the formula:

$$m = i/o$$

Illustratively, o=0.6R and i=3R and the magnification is 5 which enables a laser with a 0.5NA to couple efficiently to a fiber with a 0.1NA. However, the exact amount of magnification is not critical.

In addition, efficient coupling is achieved when the longitudinal axis 11 of the laser and the longitudinal axis 12 of the fiber are each oriented at an angle Alpha with respect to the optical axis of the mirror. (In other words, the optical axis bisects the angle between the axes of the laser and fiber). The angle Alpha is chosen so that the intersection point I of axes 11 and 12 coincides with the vertex V of the mirror. Illustratively, Alpha=5.7 degrees in the example of the FIGURE. To this end, the laser submount 2 has a surface 2a on which the laser 3 is mounted. The surface 2a has a slope Alpha as shown in the FIGURE. Similarly, the fiber submount 4 has a surface 4a on which the fiber 5 is mounted. The surface 4a also has a slope Alpha as shown in the FIGURE.

To use the coupling mechanism of the present invention, the angled blocks comprising the laser submount 2 and the fiber submount 4 serve to establish the relative spacing between the front emission facet 10 of the laser diode and the entrance face 6 of the fiber parallel to the optical axis and to establish the angular relationship between the longitudinal axes of the laser and fiber. The position of the mirror is then adjusted forwards and/or backwards so that the distances i and o are established and so that the intersection point I of the axes of the laser and fiber is substantially coincident with the vertex V of the mirror. The output of the fiber corresponding with its position may be monitored with a detector for detecting a relative maximum corresponding to the position of the mirror which optimizes coupling. The mirror is then attached to the common submount 1 using a welding technique or a UV curable cement.

One problem with the coupling mechanism shown in the FIGURE is that part of the radiation cone 31 of the fiber is shaded by the laser diode 3 and submount 2. This means that some of the radiation emitted by the laser diode and reflected from the spherical mirror is blocked by the body of the laser and laser submount. The portion of the laser submount and laser which does this blocking is designated by the numeral 40 in the FIGURE. Note that only the tail portion of the Gaussian shaped beam produced by the laser is obstructed. The tail portion of a Gaussian beam contains only a fraction of the beam energy. The aunt of shading can be reduced by moving the laser and its submount back away from the mirror so that they are located entirely outside the radiation cone of the fiber. However, moving the laser emission facet away from the mirror will increase the object distance, and decrease the magnification (i.e., the ratio i/o) which in turn will lower the coupling efficiency. Thus, in the embodiment of the invention shown in the FIGURE, there is a trade off between magnification and shading the fiber radiation cone. This suggests that an optimum coupling position exists for the fiber placement.

In an illustrative embodiment of the invention, a detector 8 is mounted on the fiber submount 4. The detector 8 detects radiation emitted from the rear facet 9 of the laser 3. Signals generated by the detector 8 in response to rear facet emissions are used to control the operation of the laser 3. The cone of radiation emitted from the rear facet of the laser 3 is designated 32 in the FIGURE. One problem with the radiation emitted from the rear facet of the laser is that some of it might enter the fiber and interfere with radiation from the front laser facet which is coupled into the fiber by way of the spherical mirror. Since the amount of magnification provided by the spherical mirror to couple the laser radiation into the fiber is adjustable, one way to solve this problem is to move the fiber inward towards the mirror so that the fiber entrance facet is outside the cone of radiation 32 defined by the radiation from the rear facet of the laser. In addition, this will reduce the fiber shading by the laser diode 3 and submount 2 and optimize the coupled power. In an alternative embodiment of the invention, the detector 8 may be mounted on surface 2a of the laser submount.

Finally, the above described embodiments of the invention are intended to be illustrative only. Numerous alternative embodiments may be devised without departing from the spirit and scope of the following claims.

I claim:

1. A combination comprising:
   a spherical mirror having a one to one imaging plane,
   a semiconductor laser diode having an emission facet located closer to said mirror than said one to one imaging plane, and
   an optical fiber having an entrance face located farther from said mirror than said one to one imaging plane,
   said mirror being positioned to couple radiation from said emission facet of said laser diode into said entrance face of said fiber.

2. The combination of claim 1 wherein an optical axis is associated with said mirror, said laser diode emission facet being located on one side of said axis and said entrance face of said fiber being located on an opposite side of said axis.

3. The combination of claim 2 wherein said laser diode defines a longitudinal axis, said optical fiber defines a longitudinal axis, and said optical axis of said mirror bisects the angle between said longitudinal axes.

4. A combination comprising:
   a spherical mirror having a one to one imaging plane,
   a semiconductor laser diode having an emission facet located closer to said mirror than said one to one imaging plane, and
   an optical fiber having an entrance face located further from said mirror than said one to one imaging plane,
   wherein said mirror is positioned to couple radiation from said emission facet of said laser diode into said entrance face of said fiber, and
   wherein said laser diode is mounted on a first submount and said fiber is mounted on a second submount, and said first submount and said second submount are mounted on a common submount.

5. The combination of claim 4 wherein said laser diode is mounted on a sloped surface of said first submount and said optical fiber is mounted on a sloped surface, of the second submount.

6. A combination comprising
   a laser diode,
   a first submount for said laser diode,
   an optical fiber,
   a second submount for said optical fiber, said first and second submounts being rigidly positioned relative to one another to fix the position of an emission facet of the laser diode relative to a tip of the fiber, and
   a spherical reflecting surface positioned for coupling radiation from said laser diode into said fiber.

7. The combination of claim 6 wherein said emission facet of said laser is located closer to said mirror than a one to one imaging plane and said tip of said fiber is located further from said mirror than said one to one imaging plane.

8. A combination comprising:
   a first waveguide having a first numerical aperture,
   a second waveguide having a second numerical aperture substantially different from said first numerical aperture, and a spherical mirror for coupling radiation from said first waveguide into said second waveguide, said spherical mirror having a one to one imaging plane, said first waveguide having a radiation transmitting surface located closer to said spherical mirror than said one to one imaging plane and said second waveguide having a radiation transmitting surface located further from said mirror than said one to one imaging plane to compensate for the difference in numerical apertures between said first and second waveguides.

9. The combination of claim 10 wherein said first waveguide is a laser diode whose transmitting surface is an emission facet and said second waveguide is an optical fiber whose transmitting surface is an entrance face. in a direction parallel to said optical axis, respectively, and so that said optical axis of said mirror bisects an angle between a longitudinal axis of said laser diode and a longitudinal axis of said fiber, and fixing the position of said mirror.

10. The combination of claim 10 wherein:
said first waveguide has a longitudinal axis,
said second waveguide has a longitudinal axis, and
said mirror has an optical axis which passes through a vertex of said mirror,
the longitudinal axis of said first and second waveguides being oriented to intersect the vertex of said mirror.

11. The combination of claim 11 wherein said combination includes a detector for detecting emissions from a rear facet of said laser.

12. A combination comprising
a semiconductor light emitting device having a numerical aperture,
an optical fiber having a numerical aperture substantially smaller than the numerical aperture of said light emitting device, and
a spherical mirror for coupling radiation from said light emitting device into said optical fiber, said spherical mirror having a one to one imaging plane, wherein an emission facet of said light emitting device is located closer to said mirror than said one to one imaging plane and an entrance surface of said fiber is located further from said mirror than said one to one imaging plane to compensate for the difference between said numerical apertures.

13. A combination comprising:
a first optical waveguide,
a first submount for said first waveguide,
a second optical waveguide,
a second submount for said second waveguide,
said first and second submounts being rigidly positioned relative to one another to fix the position of a light transmitting surface of the first waveguide relative to a light transmitting surface of the second waveguide, and
a spherical reflecting surface positioned to couple light from the transmitting surface of one of said waveguides to the transmitting surface of the other of said waveguides.

14. The combination of claim 13 wherein said first optical waveguide is a semiconductor laser waveguide whose light transmitting surface is an emission facet and said second optical waveguide is an optical fiber whose light transmitting surface is an end face.

15. A method for forming a coupling between a laser diode and an optical fiber utilizing a spherical mirror having an optical axis, said method comprising the steps of:
fixedly mounting said fiber and said laser on a mounting structure to establish the position of an emission facet of the laser diode relative to the position of a tip of said fiber,
adjusting the position of said mirror so that said emission facet and said tip are located at first and second predetermined distancs from said mirror in a direction parallel to said optical axis, respectively, and so that said optical axis of said mirror bisects an angle between a longitudinal axis of said laser diode and a longitudinal axis of said fiber, and
fixing the position of said mirror.

* * * * *

UNITED STATES PATENT OFFICE
CERTIFICATE OF CORRECTION

Patent No. 4,902,093　　　　　　　　　Dated　　　February 20, 1990

Inventor(s)　　　Terry Patrick Bowen

It is certified that error appears in the above-identified patent and that said Letters Patent is hereby corrected as shown below:

Claim 9, column 7, lines 16-20 should be deleted.

Claim 15, column 8, line 36, the word "distancs" should be --distances--.

Signed and Sealed this

Thirtieth Day of April, 1991

*Attest:*

HARRY F. MANBECK, JR.

*Attesting Officer*　　　　*Commissioner of Patents and Trademarks*